(No Model.)
J. H. KAUFMAN.
ADJUSTABLE MAP OR CHART STAND.
No. 491,358. Patented Feb. 7, 1893.
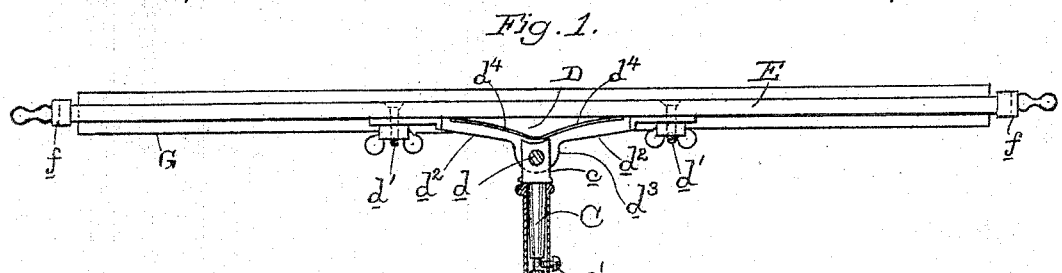
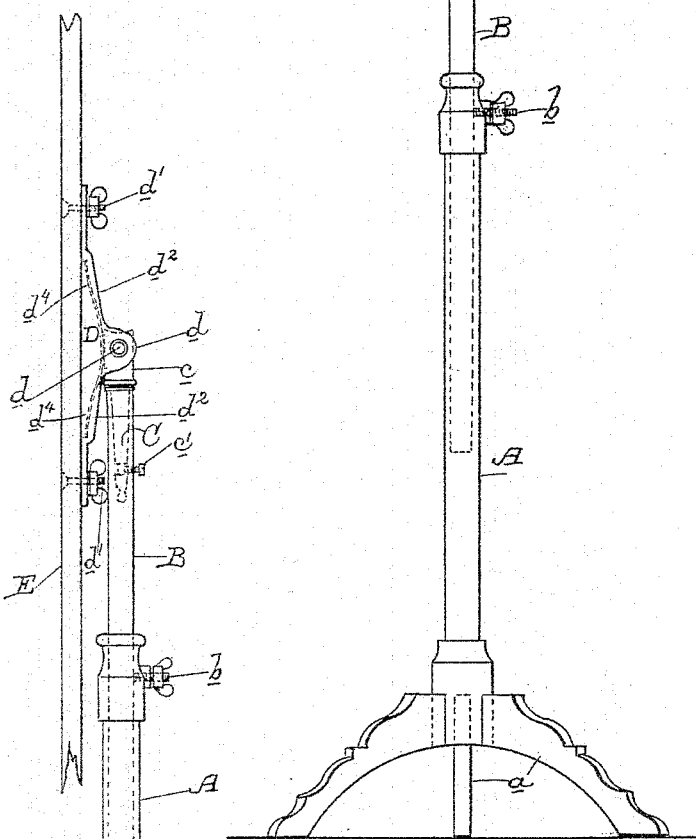
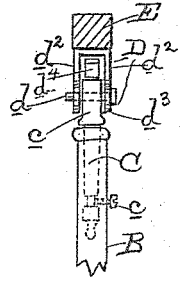
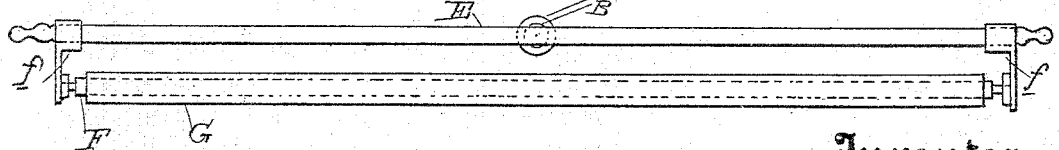
Witnesses,
Inventor,
Jacob H. Kaufman
By Dewey & Co.
Attys

UNITED STATES PATENT OFFICE.

JACOB HENRY KAUFMAN, OF MARYSVILLE, CALIFORNIA.

ADJUSTABLE MAP OR CHART STAND.

SPECIFICATION forming part of Letters Patent No. 491,358, dated February 7, 1893.

Application filed October 1, 1892. Serial No. 447,516. (No model.)

*To all whom it may concern:*

Be it known that I, JACOB HENRY KAUFMAN, a citizen of the United States, residing at Marysville, Yuba county, State of California, have invented an Improvement in Adjustable Map or Chart Stands; and I hereby declare the following to be a full, clear, and exact description of the same.

My invention relates to that class of stands for holding and suspending maps and charts, in which a horizontal arm or bar, which carries the map or chart, is supported upon a vertically adjustable rod, mounted in a hollow standard.

My invention consists in the novel combinations and arrangements of parts hereinafter fully described and specifically pointed out in the claims.

The object of my invention is to provide a stand for maps or charts, adapted to be vertically adjusted to different heights, and to be adjusted axially to different angles, said stand being adapted to receive successive supporting arms for different maps or charts, and to permit the arm with its map or chart, when in place on the stand, to be turned from a horizontal position in which said map or chart can be exhibited, to a vertical position in which it is out of the way.

Referring to the accompanying drawings for a more complete explanation of my invention,—Figure 1 is an elevation of my map and chart stand showing it in position for use. Fig. 2 is a top view. Fig. 3 is detail of the hinge connection. Fig. 4 is an elevation showing the arm E turned to a perpendicular position out of the way.

A is a hollow standard having a suitable supporting base $a$. In the standard is mounted a rod B adapted to be moved up or down therein to different heights, said rod being adjusted and fixed in proper position by a set screw $b$. In the upper end of rod B is fitted a short spindle C, adapted to turn axially in its seat. This spindle has a head $c$ with which is connected a bracket D. The connection is a hinged one, effected by a horizontal pin $d$, whereby the bracket may be turned from a horizontal to a vertical position.

Fitted and secured to the bracket D is the long map or chart supporting arm E. To the ends of this arm are secured the brackets or fixtures $f$ of an ordinary spring-actuated roller F, to which is secured the map or chart G.

To exhibit the map, the arm E lies in a horizontal position. The map is unrolled from the roller F in the same manner as a window curtain. By the vertical adjustment of rod B, the map is bodily lifted or lowered to the required height. By the turning of the spindle C, the map is brought around to squarely face the observer in whatever position he may be. When no further inspection is required, the map is wound up on the roller, and then the arm E is turned to a vertical position, so that said arm, with its roller and map, lie snugly and in small compass beside the standard A. The whole device may then be placed in a corner out of the way.

The map is easily unrolled and rolled up again, and the entire stand is convenient for use, portable, compact, and well adapted for all the purposes of map and chart exhibitions. To increase its convenience and aptitude for the purposes intended, there are certain novel details of construction to which attention will now be directed. The first is to provide for the fitting to the stand of different arms E carrying different maps and charts, whereby the same standard and connected parts will serve for the successive use of a series of maps or charts. This result is effected by providing a suitable removable connection between the arm E and rod B. This may be done by simply making the turnable spindle C removable from the rod, but I prefer to allow the spindle to remain permanently connected with the rod as by the retaining screw $c'$ and make the removable connection directly between the arm E and the bracket D which is hinged to the spindle head. This removable connection may be of any suitable character adapted to be easily made and broken. I have here shown a couple of thumb screws $d'$ for this purpose, though it is understood that I do not confine myself to such connection. Now, it will be seen that I may have any number of arms E with rollers and maps, and may readily fit any one of them to the bracket D, so that I need have but one stand with its connected parts.

Another detail of construction is in the hinge connection between the bracket D and spindle C.

I am aware that it is not new in map-stands, and kindred supports to have a vertically adjustable rod to provide for different elevations, but I am not aware that the supporting arm of the map has ever been connected with the rod by a hinge joint permitting said arm to be turned from a horizontal to a vertical position in order to get it out of the way. Therefore, while I do not confine myself to any particular form of hinge for effecting this connection, nor to its location in the organism, I have found by experience that the hinge here shown is best adapted for this purpose. The head $c$ of the spindle is an enlarged one having a comparatively extensive upper surface which is approximately flat, or having a slight central depression. The base of the bracket D has two downwardly extending flanges $d^2$ terminating in separated ears $d^3$. These ears fit over each side of the head $c$ of the spindle and receive the pivot pin $d$. Seated between the flanges $d^2$ is a flat spring $d^4$ which bears on top of the upper surface of head $c$ of spindle C. The bracket D, when in a horizontal position, rests firmly upon the head $c$ and is sufficiently stable for all purposes, being held by the pressure of spring $d^4$ on the head. At the same time the bracket D and the arm E can readily be turned to a vertical position on either side of the head, the spring yielding as it passes over the edges of the head and then bearing against the side of the head, thus holding the bracket and arm with sufficient firmness and stability in either a horizontal or a perpendicular position.

Having thus described my invention, what I claim as new and desire to secure by Letters Patent is—

1. A map and chart stand consisting of a standard, a rod vertically movable and adjustable therein, a spindle axially turnable in the upper end of the rod, an arm connected with the spindle and a roller carried by the arm and to which the map or chart is secured, substantially as herein described.

2. A map and chart stand consisting of a standard, a rod vertically movable and adjustable therein, an arm and a roller carried by said arm and to which the map or chart is to be secured and a hinge connection between the arm and rod whereby the former may be turned from a horizontal to a perpendicular position and vice versa, substantially as herein described.

3. A map and chart stand consisting of a standard, a rod vertically movable and adjustable therein, a spindle axially turnable in the upper end of the rod, an arm and a roller carried by said arm and to which the map or chart is to be secured and a hinge connection between the arm and the spindle whereby the former may be turned from a horizontal to a perpendicular position and vice versa, substantially as herein described.

4. A map and chart stand consisting of a standard, a rod vertically movable and adjustable therein, a spindle axially turnable in the upper end of the rod, a bracket hinged to spindle whereby it is adapted to turn to and from a horizontal position, an arm secured to the bracket and a roller carried by the arm and to which the map or chart is to be secured, substantially as herein described.

5. A map and chart stand consisting of a standard, a rod vertically movable and adjustable therein, a spindle axially turnable in the upper end of the rod, a bracket hinged to the spindle whereby it may turn to and from a horizontal position, an arm carrying a roller for the map or chart and a removable connection between the bracket and arm, substantially as herein described.

6. A map and chart stand consisting of a standard, a rod vertically movable and adjustable therein, a spindle axially turnable in the top of said rod, said spindle having an enlarged head, a bracket having spaced flanges with ears fitting over the head of the spindle, the horizontal pin pivoting said ears to the spindle head and the spring between the flanges and bearing on the head whereby said bracket may be turned to and from a horizontal position, and the roller carrying arm secured to the bracket, substantially as herein described.

In witness whereof I have hereunto set my hand.

JACOB HENRY KAUFMAN.

Witnesses:
W. T. ELLIS, Jr.,
J. U. HOPSTETTER.